United States Patent

[11] 3,568,016

[72] Inventor Donald E. Barber
South Milwaukee, Wis.
[21] Appl. No. 767,285
[22] Filed Oct. 14, 1968
[45] Patented Mar. 2, 1971
[73] Assignee Bucyrus-Erie Company
South Milwaukee, Wis.

[54] VARIABLE SPEED MOTOR VENTILATION SYSTEM
4 Claims, 2 Drawing Figs.
[52] U.S. Cl........................................ 318/78,
318/49, 310/53
[51] Int. Cl........................................ H02p 5/46
[50] Field of Search............................ 318/49, 50,
77, 78; 310/198, 112

[56] References Cited
UNITED STATES PATENTS
1,366,580 1/1921 Martin........................ 318/49
1,751,424 3/1930 Rosenthal.................... 310/112
2,182,630 12/1939 Kenyon....................... 318/49
2,524,361 10/1950 Sawyer........................ 310/191UX Primary Examiner—Oris L. Rader
Assistant Examiner—Thomas Langer
Attorneys—Joseph D. Bizzano, Jr., Arthur H. Seidel and Ray G. Olander ABSTRACT: A ventilating system for an alternating current wound rotor induction motor having resistors in the secondary circuit of the rotor, in which a cooling fan driven by an auxiliary motor is provided for circulating air through the induction motor. The auxiliary fan motor is energized through connections with the resistors in the rotor secondary circuit, and the speed of the fan motor is dependent upon the frequency or voltage appearing at the connections with the resistors, whereby fan motor speed will increase whenever the wound rotor induction motor speed decreases to ensure an adequate flow of cooling air.

PATENTED MAR 2 1971 3,568,016

INVENTOR
DONALD E. BARBER

BY Joseph D. Bizzaro

ATTORNEY

VARIABLE SPEED MOTOR VENTILATION SYSTEM

BACKGROUND OF THE INVENTION

This invention relates to a ventilation system for alternating current motors, such as wound rotor induction motors, the purpose being to insure an ample supply of cooling air to the motor windings over a wide range of motor speed including very low speeds.

The cooling of induction motors has usually been accomplished by the provision of fan blades mounted on the rotor which turn over at the same speed as the motor shaft. This arrangement works satisfactorily at the higher rates of motor speed, for then the fan blades can move an adequate quantity of cooling air through the motor. However, this is not a satisfactory arrangement when the motor is operating at low rates of speed. The danger of the motor overheating is increased in such a situation, because the fan blades do not have adequate rotational velocity to circulate a sufficient quantity of cooling air. This problem is commonly overcome by provision of a fan that rotates independently of the rotor shaft and by providing a separate constant speed motor for driving such fan. Such a fan may be mounted within the main motor in a concentric arrangement with the rotor shaft, or may be mounted upon the main motor casing as a separate, auxiliary device. Such constructions, however, require substantial power to drive the auxiliary fan motor, and the energy requirement for the separate fan motor can become quite significant.

SUMMARY OF THE INVENTION

The present invention provides a cooling system adapted primarily for an alternating current motor having external resistors connected in the motor secondary circuit, such system including a cooling fan in air circulating relation with the motor, a separate fan motor, and circuit connections joining the fan motor to the secondary resistors to operate such fan motor from a voltage appearing across the resistors.

The frequency and voltage that appear in a motor secondary circuit vary with motor speed. For high rates of speed these parameters will be relatively low, for the reason that rotor speed approaches synchronous speed and the rate of the rotor windings cutting magnetic flux is reduced. Conversely, when the motor is turning over at low speeds the frequency and voltage will be relatively high. In a wound rotor motor having external secondary resistors, connections can be readily made to the resistors for operating an auxiliary fan motor in response to these frequency and voltage values. Such connections off the secondary resistors are made in the present invention, and the fan motor consequently operates at a speed dictated by the frequency or voltage appearing across the secondary resistors.

The cooling air for the main motor that is circulated by the auxiliary fan motor supplements the air circulated by the fan blades on the rotor of the main motor. Thus, when the main motor is operating at high speeds, a sufficient quantity of cooling air is furnished primarily by the rotor driven fan blades. At these high rates of speed, the quantity of supplemental air delivered by the auxiliary fan motor is relatively small, since the operating speed of such fan motor is relatively low due to the low frequency or voltage appearing across the secondary resistors of the main motor. When the main motor speed decreases to a low value the rotor driven fan blades of the main motor no longer provide a sufficient quantity of cooling air. However, at these low speeds the quantity of supplemental cooling air delivered by the auxiliary fan motor becomes relatively large, and adequate, because of the high frequency or voltage that appears across the secondary resistors of the main motor. It is contemplated that such supplemental cooling air can be delivered by the auxiliary fan motor without requiring significant additional energy input. This is because the auxiliary fan motor may advantageously consume a portion of the energy that is otherwise dissipated as a heat loss by the external secondary resistors of the main motor. Thus, the auxiliary cooling fan of the invention is particularly effective for providing supplementary cooling air at low motor speeds, while simultaneously functioning as an energy dissipating device in the main motor secondary circuit wherein the energy is converted to a useful purpose, rather than merely being dissipated as a heat loss.

The auxiliary fan motor may be either an alternating current or a direct current motor. If an alternating current motor is selected it may be connected directly to the secondary resistors of the main motor, and its operating speed will be proportional to frequency in the main motor secondary. If a direct current fan motor is employed it is operated through a rectifier connected to the secondary resistors, and its operating speed will be proportional to the secondary voltage of the main motor.

Objects of the present invention are: to provide improvements in cooling systems for alternating current wound rotor induction motors; to provide a cooling system for a wound rotor induction motor that operates off of the energy normally wasted in the external secondary resistors of such motor; to provide a cooling system for a wound rotor induction motor that employs an auxiliary fan motor for delivering cooling air which operates at the frequency or voltage appearing across the secondary resistors of the main motor; and to provide a cooling system for an alternating current wound rotor induction motor which increases the air supply when the motor is operating at low speeds. Other objects and advantages will become apparent from the following description in which there is shown, by way of illustration and not of limitation, preferred embodiments of the invention.

DESCRIPTION OF THE PREFERRED EMBODIMENTS

Figure 1:
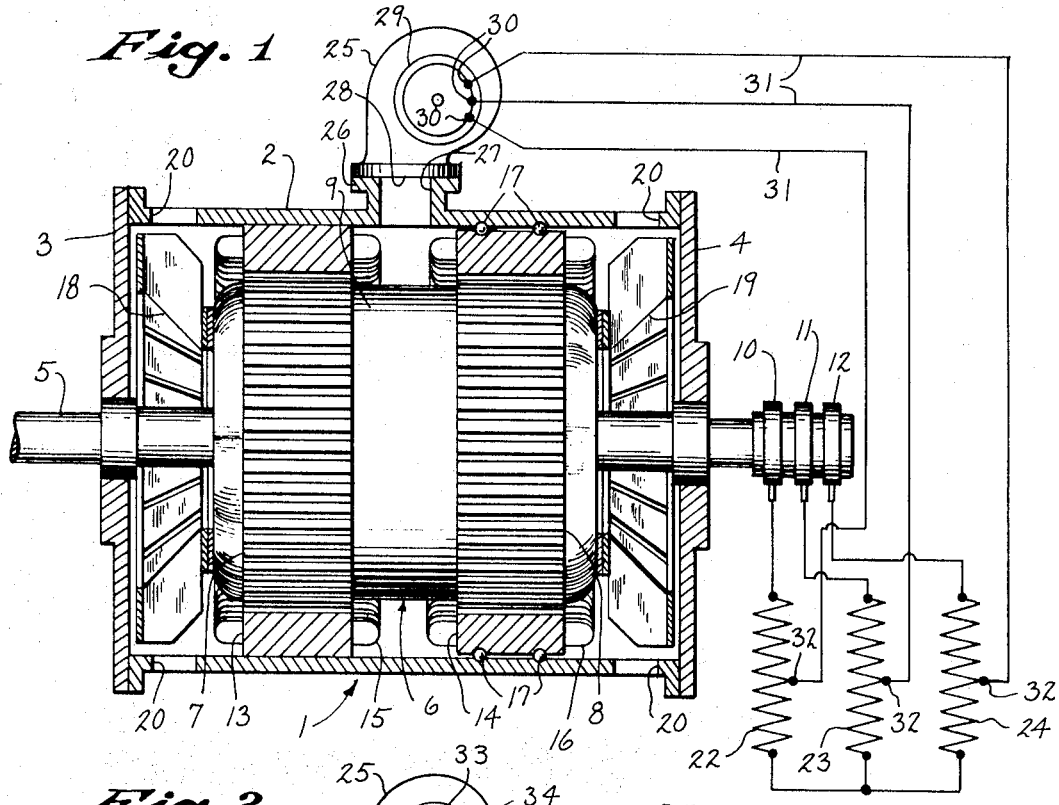
FIG. 1 is a side view in cross section of a wound rotor induction motor with a secondary circuit shown schematically, which motor is provided with a cooling system embodying the invention that has an alternating current motor for driving a cooling fan.

Referring to the drawing, there is shown in FIG. 1 an alternating current motor in the form of a wound rotor induction motor 1. The motor 1 is provided with a cylindrical housing 2 and end bells 3 and 4. A motor shaft 5 extends axially through the housing 2 and is journaled in suitable bearings provided in the end bells 3, 4.

Rigidly secured to the shaft 5 is a rotor assembly 6 which, in the present instance, is formed of two portions 7 and 8. Both rotor portions 7, 8 have magnetic laminations with slots that receive and seat a common three-phase winding 9. The end leads of the winding 9 are brought out to slip rings 10, 11 and 12 at the right hand end of the shaft 5. Mounted in the housing 2 and aligned with the rotor portions 7, 8 are two stator assemblies 13 and 14 which have separate three-phase windings 15 and 16 respectively that are adapted for connection to a three-phase power supply.

As specifically shown in FIG. 1, the left hand stator 13 is fixed within the housing 2, and the right hand stator 14 is mounted within the housing 2 on antifriction bearings 17 which occupy complementary grooves formed on the interior wall of the housing 2 and the outside of the stator 14. With this arrangement, the right hand stator 14 can be rotatably adjusted with respect to the fixed stator 13, thereby to vary its physical phase positioning with respect to such stator 13 as well as the motor output characteristics. The provision of two stator windings 15, 16 causes two voltages to be induced in each rotor conductor, and the ability to rotatably orient one stator with respect to the other provides for a phase displacement of one voltage with respect to the other. A resultant voltage is then obtained across the conductor that can be varied in value. Thus, in the illustrated motor 1, the right hand stator 14 can be adjusted to a null position in which the voltages induced in the rotor winding 9 are opposite in phase and cancel one another, so that the motor torque is zero. The movable stator 14 can also be adjusted to a position in which the induced voltages are additive and motor torque is then a maximum. Further, any intermediate stator position can be selected to achieve stepless torque or speed control. Motors such as the one described herein are commonly referred to as dual stator motors.

The motor 1 is provided with two rotor mounted centrifugal fans 18 and 19 which are located respectively between the end bells 3, 4 and the rotor 6. Disposed on the housing 2 and spaced radially from the fans 18, 19 are air discharge openings 20 that communicate between the interior and exterior of the housing and through which air is ejected by the centrifugal action of the fans 18, 19. Such fans 18, 19 are particularly effective at the relatively high rotor speeds for moving adequate quantities of cooling air across and through the rotor winding 9 and stator windings 15, 16. However, at reduced rotor speeds the quantity of cooling air moved by the fans 18, 19 is insufficient and needs to be supplemented.

As hereinbefore described, the end leads of the rotor winding 9 are brought out to the slip rings 10, 11 and 12. Connected to the winding 9 through the slip rings 10, 11, 12 are usual, external, secondary resistors 22, 23 and 24 which provide a means of dissipating heat energy in the motor secondary circuit outside the motor 1, and which also provide a means for changing the resistance of the rotor circuit to vary the shape of the speed-torque curve of the motor. The elements for adjusting the resistance value are not shown, since they do not play a part of the present invention.

In accordance with the embodiment of the invention shown in FIG. 1, an auxiliary, centrifugal cooling fan 25 is mounted upon a flanged support 26 on the top of the housing 2, the support 26 having a passage 27 that communicates between the interior of the housing 2 and the outlet duct 28 of fan 25. Air drawn into the fan 25 is discharged through the outlet duct 28 and passage 27 into the interior of the motor housing 2, where such air contacts and cools the rotor, stators and windings.

An auxiliary alternating current fan motor 29 is used for driving the cooling fan 25. There are input connections 30 on the fan motor 29 that are joined by leads 31 to taps 32 provided on the external resistors 22, 23 and 24 in the main motor secondary, so that a voltage appearing across the resistors can be picked off for operating the motor 29. With this unique arrangement, a portion of the energy consumed in the secondary circuit of the motor 1 is utilized to drive the auxiliary fan 25 and pump cooling air to the main motor 1. The amount of energy dissipated as heat in the external resistors 22, 23, 24 can be reduced and, accordingly, the efficiency of operating an auxiliary fan with a separate motor is enhanced through the use of a portion of the energy that is otherwise dissipated as a heat loss.

The speed of the alternating current fan motor is a function of the frequency at its input terminals, and as hereinbefore stated frequency in the main motor secondary circuit varies with the speed of the rotor 6. Thus, when the main motor 1 is turning over at low speeds, the frequency in the main motor secondary is relatively high. Under such operating conditions, the rotor-driven fans 18, 19 do not furnish sufficient cooling air to the motor 1 because the rotor 6 is turning over too slowly. However, the auxiliary fan motor 29 will be at a relatively high speed, since it operates off of the secondary frequency, to deliver an adequate quantity of supplemental cooling air to the main motor 1. Conversely, as the speed of the rotor 6 increases, the secondary frequency decreases, causing the auxiliary fan motor 29 to slow down and provide less supplemental cooling air. When the main motor 1 is operating at such increased speeds, the cooling of the rotor 6, stators 13, 14 and windings 9, 15, 16 is accomplished primarily by the rotor fans 18, 19. The fans 18, 19 draw cooling air through the motor 1 and discharge it through the openings 20 in the motor housing 2. Thus, adequate quantities of cooling air are provided to the main motor 1 for all speed conditions.

Figure 2:
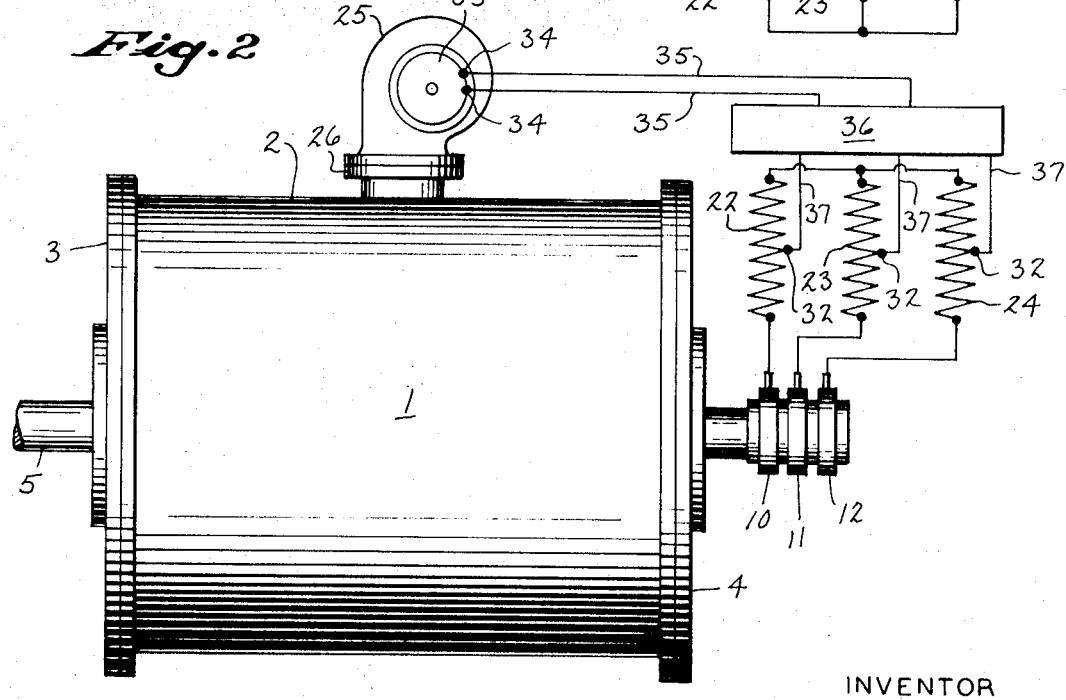
FIG. 2 discloses a second embodiment of the invention which includes a direct current motor for driving a cooling fan.

With reference to FIG. 2, there is shown an alternative embodiment of the invention. An auxiliary direct current fan motor 33 is provided for driving the cooling fan 25. With such direct current motor, the fan 25 can have unidirectional operation regardless of the direction of rotation of the main motor 1. The direct current motor 33 is operated off the secondary resistors 22, 23 and 24, but the operating current must first be rectified. To accomplish this, input connections 34 on the direct current motor 33 are joined by leads 35 to the output of a three-phase rectifier 36, and the input of the rectifier 36 is joined by leads 37 to the taps 32 on the secondary resistors 22, 23, 24.

The speed of the direct current motor 33 varies as a direct function of the impressed voltage, and the voltage appearing across the secondary resistors 22, 23, 24 to operate the direct current motor varies with the speed of the main alternating current motor 1. Thus, if the main motor speed is relatively low, the secondary voltage will be high causing the auxiliary direct current fan motor 33 to drive increased and sufficient quantities of supplemental cooling air to the motor 1. Conversely, as the main motor speed increases, the secondary voltage decreases and the amount of supplemental cooling air circulated by the fan 25 decreases. However, at this latter operating condition, the rotor-operated fans 18, 19 function to provide the bulk of the required cooling air to the main motor 1, as in the case of the alternating current fan motor 29.

Although the embodiments of the invention shown are in conjunction with a dual stator wound rotor induction motor, the invention may also be employed with other variable speed motors. In the embodiments shown an auxiliary fan supplements the fan attached to and forming a part of the main motor rotor. Such supplementary fan automatically increases its output when the rotor fan slows down at lower motor speeds. It is to be understood that a main rotor fan is not a necessary element of the invention, and that the invention can be practiced with other forms of main fans, or without a main fan if the occasion arises where this is desirable. Hence, the invention provides a self accommodating cooling fan that can be advantageously incorporated into variable speed motors of different designs.

I claim:

1. In a cooling system for a variable speed alternating current motor having rotor and stator elements, the combination comprising:
   two sets of windings for one of said elements that are shiftable relative to one another to induce voltages in the other said element that are phase displaceable to vary motor speed steplessly;
   a secondary circuit for said other element with connections to derive a voltage therefrom that varies in frequency inversely with rotor element speed;
   a first cooling fan that turns with said rotor element to deliver cooling air to the motor in an amount proportional to rotor element speed;
   a second cooling fan in air circulating relation with said motor; and
   a fan motor driving said second cooling fan which is electrically joined with said secondary connections to be operated therefrom at a speed inversely proportional to said rotor element speed for supplying cooling air in an amount varying inversely with that delivered by said first cooling fan.

2. A cooling system as in claim 1 having a rectifier between said secondary connections and said second cooling fan, the second cooling fan being a direct current motor.

3. In a cooling system for a variable speed alternating current motor having rotor and stator elements, the combination comprising:
   a circuit for one of said elements having secondary resistance that shapes the motor speed-torque curve and provides variable speed for the motor;
   connections for said circuit to derive a voltage therefrom that varies in frequency inversely with rotor element speed;

a first cooling fan that turns with said rotor element to deliver cooling air to the motor in an amount proportional to rotor element speed;

a second cooling fan in air circulating relation with said motor; and a fan motor driving said second cooling fan which is electrically joined with said connections to be operated therefrom at a speed inversely proportional to said rotor element speed for supplying cooling air in an amount varying inversely with that delivered by said first cooling fan.

4. A cooling system as in claim 3 having a rectifier between said connections and said second cooling fan, the second cooling fan being a direct current motor.